United States Patent [19]

Gingerich

[11] 4,251,566
[45] Feb. 17, 1981

[54] GUM THICKNESS REGULATOR

[75] Inventor: David L. Gingerich, Farmington, Mich.

[73] Assignee: Champion International Corporation, Stamford, Conn.

[21] Appl. No.: 950,627

[22] Filed: Oct. 12, 1978

[51] Int. Cl.³ .................. B05C 5/00; B05C 1/02; B05D 1/02
[52] U.S. Cl. .................. 427/10; 118/262; 118/665; 118/684; 118/688; 118/712; 427/424; 427/428
[58] Field of Search .................. 427/207 R, 177, 421, 427/179, 428, 401, 8, 9, 10, 424; 118/2, 7, 262, 712, 684, 688, 249, 665; 156/64; 101/350

[56] References Cited

U.S. PATENT DOCUMENTS

| 1,815,915 | 7/1931 | Kallander | 427/10 |
| 2,951,416 | 9/1960 | Shinn | 118/8 X |
| 3,130,303 | 4/1964 | Dobbins | 118/688 |
| 3,711,312 | 1/1973 | Yoshida et al. | 118/7 X |
| 3,730,086 | 5/1973 | Dauterman | 101/350 X |
| 4,013,037 | 3/1977 | Warning et al. | 118/2 |
| 4,052,937 | 10/1977 | Lawson et al. | 118/7 X |

FOREIGN PATENT DOCUMENTS 7406288  11/1975  Netherlands .................. 118/7

Primary Examiner—John P. McIntosh
Attorney, Agent, or Firm—Evelyn M. Sommer

[57] ABSTRACT

A device for regulating the thickness of gum applied to a paper product comprising means applying gum to said paper product, means for detecting the thickness of the gum being applied to said paper product and producing a control signal which varies with said thickness, and means connected to said detecting means for receiving said control signal and automatically adjusting the amount of said gum being applied to obtain a desired thickness.

8 Claims, 9 Drawing Figures

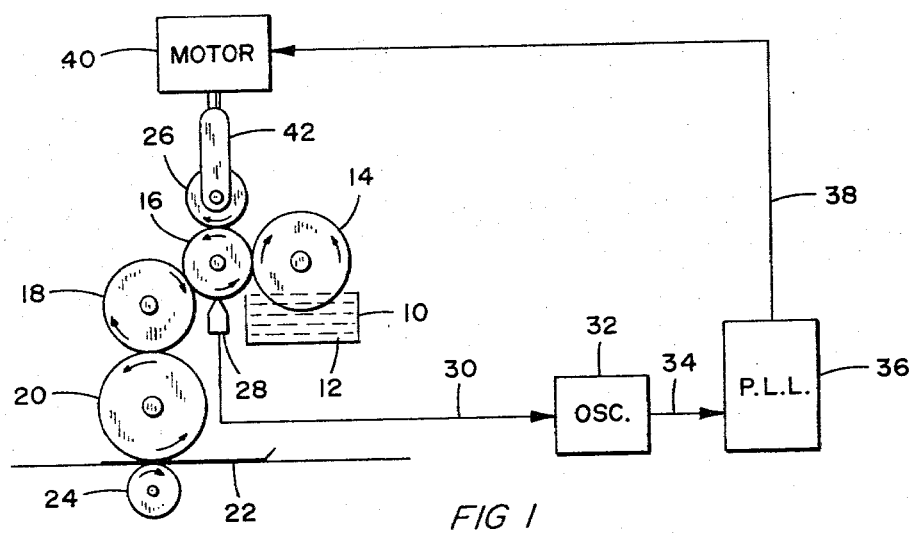
FIG 1
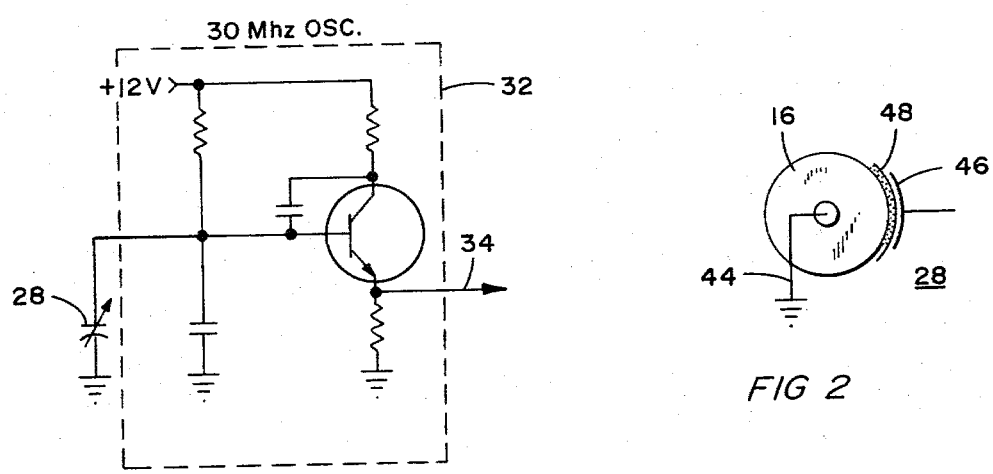
FIG 3
FIG 2
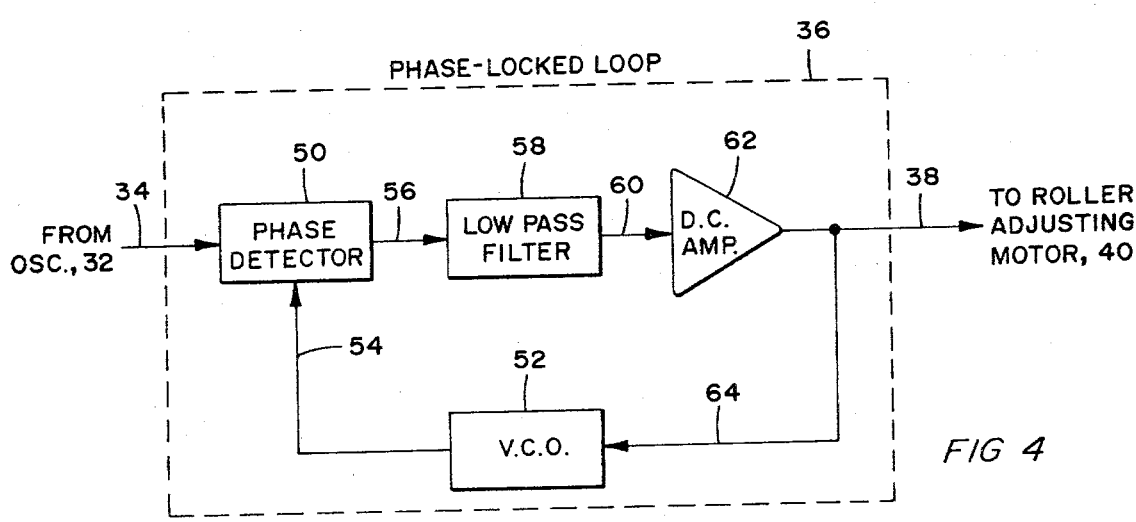
FIG 4

GUM THICKNESS REGULATOR

BACKGROUND OF THE INVENTION

The present invention relates to a novel gumming attachment for an envelope folding machine, and more particularly, to a novel means and manner of applying adhesive to desired areas on the body and sealing flap of an envelope in a closely regulated manner wherein the thickness of the adhesive being applied to the envelope is maintained within close tolerances. It is well known in this art that it is important to have sufficient adhesive to insure effective sealing, but to keep the thickness of the adhesive applied to an envelope to a minimum. If the thickness of the adhesive being applied is less than 0.0008 inch, effective sealing may not take place; sometimes the sealing will function and sometimes it will not. To provide sufficient adhesive, present day gumming machines attempt to regulate the thickness of the adhesive between 0.0008 inch and 0.0015 inch and cannot successfully regulate the range more narrowly. It is evident that if the thickness could be maintained between 0.0008 inch and 0.0010 inch, up to 50% adhesive cost savings could be obtained.

The method of regulating adhesive thickness in the prior art follows one of several methods. For ease of description, the adhesive will hereinafter be referred to as "gum." Basically, the gummers of the prior art comprise a gum source roller which is constantly rotating in a gum tray with the gum being carried out of the tray by the roller. This roller usually engages a second roller which transfers the gum to a third roller. Overlying the third roller may be a fourth roller whose position with respect to the third roller is such as to regulate the space between them and, in turn, regulate the desired thickness of the layer of gum which covers the third roller as it moves away from the fourth roller. With the thickness of the gum being thus regulated on the third roller, a fifth pattern roller is brought into contact with the third roller and receives the gum from it and either applies it directly to the paper product or to a sixth roller which would apply the gum to the paper product. The gum thickness regulation roller is manually adjusted and, as would be expected, does not provide a constant thickness of gum because of the gum consistency, variations in temperature and the like. Thus, the gum that is being applied to the envelopes varies widely in thickness and needs to be more closely maintained.

Another type of a gum thickness regulator includes a scraper blade spanning the gum source roller with the outer end of the scraper containing a vertical adjusting screw for adjusting the position of the scraper blade relative to the applicator roll to scrape off excess gum. Thus, the quantity of gum adhering to this roller is adjusted and controlled in thickness. Again, this method is not extremely accurate in regulating the thickness of the gum being applied to the envelopes. The unit must be adjusted frequently and, even then, gum thickness varies with temperature, gum consistency, and the like.

SUMMARY OF THE INVENTION

The present invention overcomes the problems of the prior art and provides a unique gum thickness regulator, particularly for apparatus for making an envelope, wherein the thickness of the gum being applied to the envelope is automatically regulated and constantly monitored to maintain a high degree of uniformity in the thickness of the gum being applied to the envelopes.

Briefly stated, the present invention relates to a device for regulating the thickness of gum applied to a paper product comprising means for applying gum to said paper product, means for continuously detecting the thickness of said gum being applied to said paper product and producing a control signal which varies with said thickness, and means connected to said detecting means for receiving said control signal and automatically adjusting the amount of said gum being applied to obtain a desired thickness.

More specifically, the device comprises an oscillator for producing a predetermined output frequency, a gum source roller, a gum transfer roller for receiving gum from said gum source roller, a capacitor coupled between said oscillator input and electrical ground, said capacitor having as one plate said gum transfer roller, a second fixed plate located a predetermined distance from said transfer source roller and a dielectric formed of the gum on said transfer roller, said dielectric and, thus, the capacitance of said capacitor, varying with said gum thickness whereby the oscillator output frequency varies with said gum thickness, a phase-locked loop having one input connected to receive said output frequency of said oscillator and producing an output control signal which varies with said oscillator frequency variations and motor means coupled to said gum transfer roller and said phase-locked loop to receive said control signal and position said gum transfer roller whereby the amount of gum transferred to a gum application roller is the desired amount.

BRIEF DESCRIPTION OF THE DRAWINGS

These and other objects and advantages of the present invention will be disclosed in the course of the following specification, reference being had to the accompanying drawings in which:

FIG. 1 is a diagrammatic representation of the apparatus and novel circuit for regulating the thickness of gum applied to a paper product.

FIG. 2 is an illustration of the preferred embodiment of a detector which may be used in the circuitry of FIG. 1 to determine the thickness of gum being applied to a paper product.

FIG. 3 is a diagrammatic representation of a circuit for an oscillator which may be used in conjunction with the detector of FIG. 2 to determine the thickness of the gum being applied to a paper product.

FIG. 4 is a general block diagram of a phase-locked loop that may be used with the present invention.

DESCRIPTION OF THE PREFERRED EMBODIMENT

Figure 5:
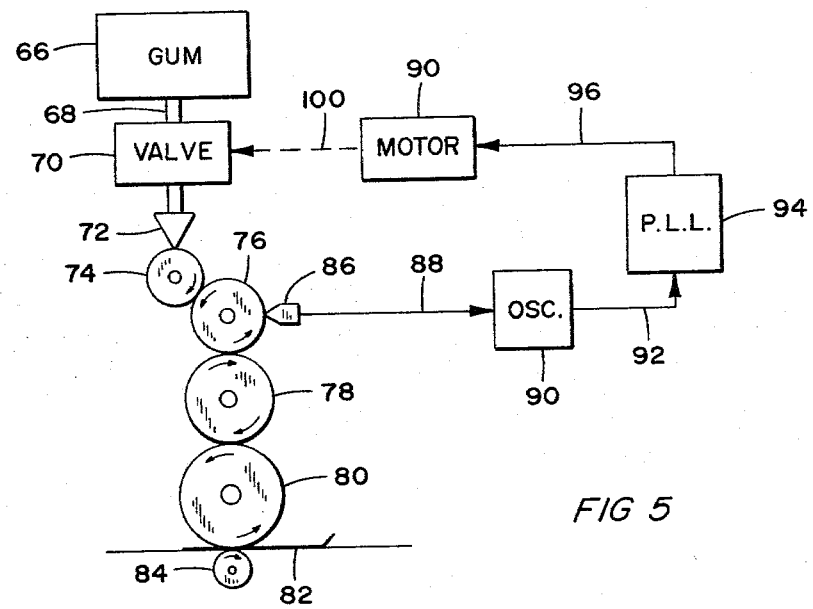
FIG. 5 is a diagrammatic illustration of a first alternative embodiment of the present invention which may be used to regulate the thickness of the gum being applied to a paper product.

FIG. 1 is a diagrammatic representation of the preferred embodiment of the present invention which is a device for regulating the thickness of the gum which is applied to paper products such as envelopes as they are in the process of being formed.

As can be seen in FIG. 1, a gum tray 10 carries a supply of gum 12 which is carried out of the tray 10 by a gum source roller 14. This roller 14 engages a gum transfer roller 16 which, in turn, engages gum pattern roller 18. Gum pattern roller 18 may have any desired pattern thereon which it is desired to use with a particular paper product. The pattern on roller 18 passes a shaped layer of gum onto gum application roller 20 which is located to contact and press against the surface of an envelope or other paper product 22 which is carried under gum application roller 20 by a drive roller 24 or other suitable means. A gum thickness regulator roller 26 is positioned over gum transfer roller 16 such as to regulate the space between them. In the prior art, roller 26 is adjusted manually and thus, the amount or thickness of the layer of gum which covers roller 16 as it moves away from roller 26 is manually adjusted. In this manner, that is, by manually adjusting the space between rollers 16 and 26, the thickness of the gum being applied to the envelope 22 or other paper product is manually regulated.

As can be well understood, this manner of regulating the thickness of the gum is inaccurate and inadequate. The present invention utilizes a circuit for automatically adjusting the position of gum thickness regulator roller 26 with respect to gum transfer roller 16 to obtain the desired thickness of gum being applied to the envelope or other paper product 22. In this circuit, gum thickness detector 28 produces an output signal which varies in accordance with the thickness of the gum on gum transfer roller 16. This signal is coupled via conductor 30 to oscillator 32 to vary the frequency thereof above or below a set frequency in accordance with the thickness of the gum on transfer roller 16. This varying frequency from oscillator 32 is coupled by conductor 34 to phase-locked loop 36. Phase-locked loop 36, as will be more fully described hereinafter with respect to FIG. 4, has a voltage controlled oscillator as a part thereof which operates at the fixed frequency of oscillator 32. When the output of oscillator 32 varies in accordance with the gum thickness on roller 16, the phase-locked loop 36 detects the difference between the frequency of its own oscillator and that being received on conductor 34 and produces a DC control signal on its output conductor 38. This signal is varying with a change in thickness of the gum on roller 16. The signal on conductor 38 is coupled to a motor 40 that drives a shaft 42 which is physically coupled to gum thickness regulator roller 26. Thus, motor 40 positions gum thickness regulator roller 26 to change the thickness of the gum thereon to cause oscillator 32 to operate at its fixed frequency. The phase-locked loop 36 is designed to cause motor 40 to hold gum thickness regulator roller 26 at the right position with respect to gum transfer roller 16 to produce the desired thickness of gum required on the envelope or other paper product 22.

FIG. 2 discloses the preferred type of detector 28 shown in FIG. 1 for detecting the thickness of the gum on gum transfer roller 16. Gum transfer roller 16 is normally a steel roller which could be used as one plate of a capacitor. Thus, as shown in FIG. 2, gum transfer roller 16 is grounded via conductor 44. The other plate of the capacitor is shown as plate 46 and is positioned close enough to drum 16 to form a capacitor. As is well known, the ability of a capacitor to store energy is called capacitance and is determined in accordance with the following formula:

$$C = \frac{\epsilon A}{4 \pi s}$$

where:

$\epsilon$ = permittivity of the dielectric,
A = plate area, and
s = the distance between the plates.

As can be seen in FIG. 2, the gum 48 separates plate 46 and drum 16 and, as will be appreciated, is a dielectric and as can be seen in relation to equation 1, the capacitance varies directly as the permittivity of the dielectric. Thus, as the thickness of the gum varies, the capacitance varies and the capacitance is thus proportional to the thickness of the gum. Integrators may be used to couple the change in voltage caused by the change in capacitance to the oscillator to minimize the effect of spikes caused by noise and the like.

Referring now to FIG. 3, if the variable capacitance derived by the capacitor shown in FIG. 2 is used as variable capacitor 28 in FIG. 3, it can provide an input to oscillator 32 which will vary the frequency thereof in accordance with the varying thickness of the gum on transfer roller 16 in FIG. 1. The oscillator in FIG. 3 is designed in the preferred embodiment to operate at approximately 30 MHz. The operation of the oscillator shown in FIG. 3 is standard and well known in the art. It is an RC oscillator whose frequency is determined by the values of the resistance, R, and capacitance, C. The frequency may be shifted by varying either R or C. For purposes of the present application, suffice it to say that oscillator 32 operates at a fixed frequency of 30 MHz and that its frequency is varied depending upon the variation of the gum thickness, or dielectric of capacitor 28, thus producing an output frequency on line 34 which is proportional to the thickness of the gum on gum transfer roller 16.

The phase-locked loop 36 is shown in FIG. 4. Phase-locked loops are, of course, old and well known in the art.

With no input signal applied to the system, the error voltage output is zero. The voltage controlled oscillator operates at a set frequency which is known as the free running frequency. If an input signal is applied to the phase-locked loop, the phase comparator compares the phase and frequency of the input with the voltage controlled oscillator frequency and generates an error voltage that is related to the phase and frequency difference between the two signals. This error voltage is filtered by a low pass filter, amplified by an amplifier and applied to the input of voltage controlled oscillator thus forcing the frequency of the voltage controlled oscillator to vary in a direction that reduces the frequency difference between its frequency and the input signal frequency. If the input signal frequency is close enough to the frequency of the voltage controlled oscillator, the feedback nature of the phase-locked loop causes the voltage controlled oscillator to synchronize or lock with the incoming signal. Once in lock, the voltage controlled oscillator frequency is identical to the input signal except for a small, finite, but constant phase difference necessary to generate the corrective error voltage which shifts the voltage controlled oscillator frequency from its free running value to the input value frequency and keeps the phased-locked loop in lock. The phase-locked loop of the present invention comprises a phase detector 50 which receives the varying frequency from oscillator 32 on line 34 and the output from a voltage controlled oscillator (V.C.O.) 52 on line 54. The base frequency of the voltage controlled oscillator 52 is the same as the base frequency of oscillator 32. Thus, phase detector 50 detects any phase shift between these two signals and produces an error voltage on line 56 which is passed through a low pass filter 58 on line 60 to an amplifier 62. The error signal thus detected is amplified and coupled via line 64 back to the voltage control of oscillator 52 to vary its frequency and to bring it into phase with the frequency obtained from oscillator 32. The output of DC amplifier 62 is also coupled via conductor 38 to motor 40 which drives the motor 40 in such a direction to position gum thickness regulator roller 26 so as to change the thickness of the gum to remove the change in the capacitance of detector 28 thus bringing the frequency of oscillator 32 back to its desired frequency thereby removing the error signal on line 38. Thus, the phase-locked loop is basically a feedback circuit which consists of a phase comparator 50, a low pass filter 58 and an error amplifier 62 in the forward signal path and a voltage controlled oscillator 52 in the feedback path.

With the novel invention of the present application, and in particular, with the preferred embodiment shown in FIG. 1, the thickness of the gum being applied to the envelope or other paper product 22 can be maintained in the range of 0.0008 and 0.0010 inch. By staying within that range of gum thickness, millions of dollars per year can be saved in costs of gum being used to seal envelopes or being applied to other paper products.

An alternative embodiment of the present invention is shown in FIG. 5 which discloses an arrangement in which a glue tray has been eliminated and gum is sprayed on a roller and the thickness of the gum being sprayed on the source roller is varied to provide the proper thickness being applied to the envelope or other paper product. Thus, gum source 66 is under pressure and applied through conduit 68 to valve 70 which regulates the amount of gum being passed to nozzle 72. Nozzle 72 is in close proximity to gum source roller 74 which receives a coating of gum thereon the thickness of which varies with the position of valve 70. Since roller 74 is in contact with gum transfer roller 76, the gum is transferred from source roller 74 to 76 and thence to gum pattern roller 78 which may have thereon the desired gum pattern for the paper product to receive. Gum application roller 80 receives the gum from pattern roller 78 and applies it to the paper product such as envelope 82 which is being driven under gum application roller 80 by a drive roller 84 or other means.

Again, a detector 86, which may be of the type shown in FIG. 2, detects the thickness of the gum on transfer roller 76 and produces an output signal on line 88 which varies with thickness of the gum. This signal on line 88 is coupled to oscillator 90 whose frequency varies with the thickness of the gum and is coupled through line 92 to phase-locked loop 94. As explained earlier, if any frequency difference exists between the frequency of oscillator 90 and the frequency of the voltage controlled oscillator in phase-locked loop 94, an error signal is produced on line 96 which is coupled to motor 98 the output of which is coupled through connection 100 to valve 70 to open or close the valve accordingly to allow more or less gum to be applied to gum source roller 74.

Figure 6:
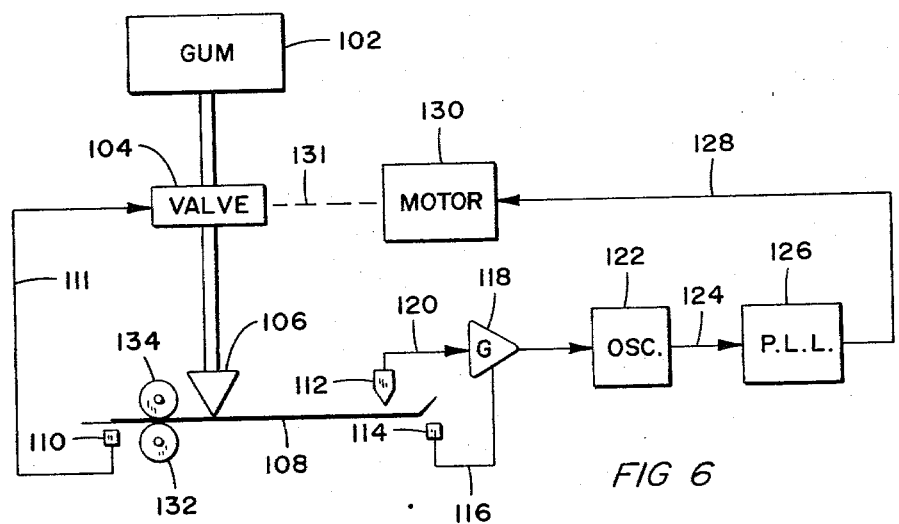
FIG. 6 is a diagrammatic representation of a second alternative embodiment of the present invention.

FIG. 6 discloses yet another embodiment of the present invention where the rollers have been eliminated and the gum is sprayed directly on the envelope or other paper product. In this particular embodiment, the gum source 102 is pressurized and passed through valve 104 to spraying nozzle 106 to be sprayed directly onto the envelope or other paper product 108. Nozzel 106, of course, may be in any particular shape or pattern for spraying gum on the envelope or other paper product 108. Photocell 110 detects the proper position of envelope or paper product 108 and produces a signal on line 111 which opens valve 104 to allow gum to be passed to nozzel 106 and sprayed on the envelope or other paper product 108. The amount of gum passing through valve 104 is automatically regulated by the circuitry of the present invention utilizing the phase-locked loop. Thus, when envelope or other paper product 108 is in the proper position for detector 112 to examine the thickness of the gum applied thereto, photocell 114 produces a signal on line 116 which is coupled to gate 118 thus allowing the output of detector 112 on line 120 to be applied to oscillator 122. Since the area on paper product 108 having the gum thickness desired to be regulated is passing under detector 112 at various intervals in time, that is, only certain locations on the envelope or other paper product 108 is to be examined, an integrating circuit must be associated with the input of oscillator 122 which has a time constant of sufficient length to "remember" the magnitude of the last signal received so that the oscillator responds only to signals representing changes in thickness of gum as detected by detector 112. This is a short time constant since the products move through the machine very rapidly. The output of oscillator 122 on line 124 is then coupled to phase-locked loop 126 which operates as previously described to produce an error signal on line 128 which drives motor 130 to position valve 104 through mechanical linkage 131 to allow more or less gum to be applied through nozzle 106 for application to the envelope or other paper product 108. Drive rollers 132 and 134 or other appropriate means are used to move envelope or other paper product 108 under nozzle 106.

Figures 7, 8, 9:
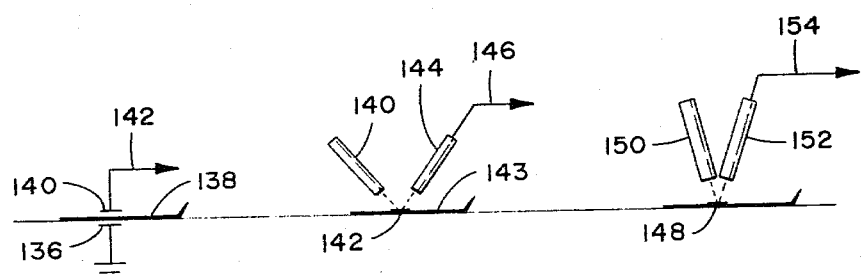
FIG. 7 is an illustration of an alternative type of detector which may be used with the present invention.
FIG. 8 is a diagrammatic illustration of still another type of detector that may be used with the present invention.
FIG. 9 is yet another diagrammatic representation of a detector which may be used with the present invention.

It is obvious that with the circuit of FIG. 6, wherein no rollers are used for transferring gum, a different type detector than that shown in FIG. 2 must be required. Thus, a capacitor may be used as shown in FIG. 7 with one plate 136 electrically grounded on one side of the envelope or other paper product 138 and a second plate 140 on the other side thereof having its output on line 142 coupled to gate 118 in FIG. 6. Thus, as the thickness of the gum 144 varies as it passes between the plates of the capacitor, the frequency of oscillator 122 is shifted as described earlier.

Other types of detectors may also be used such as that shown in FIG. 8 and FIG. 9. In FIG. 8, a light source 140 causes a light to be reflected off of gum 142 on envelope or other paper product 143 which is received by receiver 144. The amount of reflected light will depend upon the thickness of gum 142 and thus, cause a signal output on line 146 which varies with the gum thickness.

Likewise, with respect to FIG. 9, a high frequency acoustical wave or a microwave may be directed onto gum 148 by source 150. The reflected waves are picked up by receiver 152 which produces a signal on output line 154 which varies in accordance with the thickness of the gum. With these devices, the signal may be applied to a voltage controlled oscillator 122 to shift the frequency thereof as described previously. Also, detectors may be used which intermittently sample the gum thickness instead of continuously sampling such thickness.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A device for regulating the thickness of gum being applied to a paper product as it passes between a drive mechanism and a gum application roller wherein said gum application roller receives a layer of gum from a gum transfer roller, the thickness of which layer corresponds to the thickness of gum being applied to said paper product, said device comprising:
   a. an oscillator for producing a predetermined output frequency,
   b. a capacitor coupled to said oscillator input, said capacitor having as one plate the surface of the gum transfer roller, and having its other plate spaced a predetermined distance from said surface of said gum transfer roller whereby said layer of gum on said surface of said gum transfer is disposed between said plates of said capacitor to form a dielectric between said plates, said dielectric and, thus, the capacitance of said capacitor, varying with the thickness of said gum layer whereby the oscillator frequency varies with said thickness of said gum layer,
   c. a phase-loop having one input connected to receive said output of said oscillator and producing a DC error output signal which varies with said oscillator frequency variations,
   d. a gum thickness regulator roller for regulating the thickness of the layer of gum on the gum transfer roller, and
   e. motor means coupled to said gum thickness regulator roller and said phase-locked loop to receive said DC error signal and position said gum thickness regulator roller whereby, the amount of gum transferred to said gum application roller is the desired amount.

2. The device of claim 1 and wherein said phase-locked loop comprises a voltage controlled oscillator for generating an AC signal having a fixed frequency and a phase detector for comparing the AC signal from the oscillator coupled to the capacitor with the AC signal from the voltage controlled oscillator and producing a DC signal related to the difference of said two signals.

3. A device for regulating the thickness of gum supplied from a source thereof onto the surface of a gum transfer roller employed for transferring said gum to a gum application roller and from said gum application roller to a paper product, comprising:
   a. a variable capacitor, said capacitor having first and second plates, said first plate comprising said gum transfer roller, said second plate being radially spaced from said gum transfer roller with said gum on said roller surface interposed between said first and second plates, said gum forming a dielectric between said first and second plates whereby the capacitance of said capacitor varies in accordance with the thickness of said gum on said gum transfer roller; and
   b. means connected to said second plate of said variable capacitor for generating a control signal and automatically adjusting the amount of said gum being applied to said gum transfer roller in response thereto to obtain the desired thickness.

4. A device as in claim 3 wherein said automatic adjusting means comprises:
   a. an oscillator coupled to said second plate of said capacitor for generating an AC output signal; and
   b. a phase locked loop coupled to said oscillator for receiving said AC output signal and producing a DC error control signal.

5. The device of claim 3 and wherein means connected to said second plate of said capacitor comprises an oscillator.

6. The device of claim 5 and wherein said means further includes a phase locked loop connected to said oscillator for producing a DC error signal related to changes in the capacitance of the capacitor, a thickness regulator roller for controlling the thickness of the gum on the surface of the gum transfer roller and a motor for controlling the position of the thickness regulator roller in accordance with said DC error signal.

7. A method of regulating the thickness of gum on the surface of a metallic gum transfer roller employed in the transfer of gum to a product, comprising the steps of:
   a. supplying gum to the surface of the gum transfer roller;
   b. determining the thickness of the gum on the gum transfer roller surface by juxtaposing a capacitor plate on the opposite side of the gum on the gum transfer roller whereby the gum on the gum transfer roller surface forms a dielectric of said capacitor and producing an AC output signal which varies in accordance with the changes in the capacitance of said capacitor, said changes in capacitance being produced by variations in said dielectric whereby said AC output signal varies in accordance with the thickness of the gum on said roller surface; and
   c. automatically adjusting the amount of gum supplied to said gum transfer roller surface in accordance with said AC output signal.

8. The method of claim 7 and wherein adjusting the amount of gum supplied to the gum transfer roller surface comprises adjusting the position of a thickness regulator roller positioned next to said gum transfer roller.

* * * * *